(12) United States Patent
DeYoung

(10) Patent No.: US 6,515,584 B2
(45) Date of Patent: Feb. 4, 2003

(54) DISTINCTIVE HAZARD FLASH PATTERNS FOR MOTOR VEHICLES AND FOR PORTABLE EMERGENCY WARNING DEVICES WITH PULSE GENERATORS TO PRODUCE SUCH PATTERNS

(76) Inventor: John W. DeYoung, 318 Kwanzan Dr., Lynden, WA (US) 98264

( * ) Notice: Subject to any disclaimer, the term of this patent is extended or adjusted under 35 U.S.C. 154(b) by 0 days.

(21) Appl. No.: 09/810,315

(22) Filed: Mar. 14, 2001

(65) Prior Publication Data

US 2002/0000912 A1 Jan. 3, 2002

Related U.S. Application Data

(60) Provisional application No. 60/190,871, filed on Mar. 21, 2000.

(51) Int. Cl.[7] .................................................. B60Q 1/34
(52) U.S. Cl. ........................ 340/475; 340/468; 340/471
(58) Field of Search ................................ 340/468, 471, 340/472, 474, 475, 479, 463, 473; 200/61.27, 61.38; 315/77, 200 A, 209 R; 307/10.8

(56) References Cited

U.S. PATENT DOCUMENTS

| | | | | |
|---|---|---|---|---|
| 3,623,154 A | * | 11/1971 | Yonezu ...................... 340/471 |
| 3,763,469 A | * | 10/1973 | Yonezu et al. ............... 340/471 |
| 4,087,784 A | * | 5/1978 | West ........................... 340/471 |
| 4,227,174 A | * | 10/1980 | Belcher et al. ............. 340/471 |
| 4,275,379 A | * | 6/1981 | Nakano et al. ............. 340/471 |
| 5,355,119 A | * | 10/1994 | Pearlman ..................... 340/468 |
| 5,764,141 A | * | 6/1998 | Chang ......................... 340/472 |
| 6,087,932 A | * | 7/2000 | Belgard ....................... 340/468 |

* cited by examiner

Primary Examiner—Van Trieu

(57) ABSTRACT

A flashing light sequence which is readily distinguished by drivers as the signal for a hazard alert as contrasted with turn signal flashes. An electronic hazard alert flasher unit is described which generates a hazard warning signal which is distinctively different in flash rate and pattern from standard turn signals and other on-off warning lights. One version of the hazard alert flasher unit is intended to replace the standard element presently used in highway vehicles to generate the turn signal and hazard flash pulse. A second version of the hazard alert flasher can be used to control the flash rate of free-standing emergency electric lanterns, illuminated emergency warning triangles, and LED substitutes for pyrotechnic flares. The proposed hazard alert flash pattern consists of three or more short flashes followed by a longer pause.

8 Claims, 6 Drawing Sheets

DISTINCTIVE HAZARD FLASH PATTERNS FOR MOTOR VEHICLES AND FOR PORTABLE EMERGENCY WARNING DEVICES WITH PULSE GENERATORS TO PRODUCE SUCH PATTERNS

RELATED APPLICATIONS

This application claims the benefits of U.S. Provisional Application No. 60/190,871, filed Mar. 21, 2000.

BACKGROUND OF THE INVENTION

1. Field of the Invention

A motor vehicle hazard warning signal which is easily and quickly distinguished from a turn signal flash and which is more eye catching than the current hazard signal could make a significant contribution to highway safety if such improved hazard signal were widely used and thus recognized by drivers as the signal of a stopped or slow-moving vehicle.

As presently designed, automobiles, trucks, and buses use the same flash rate and pattern for hazard flashers as is used for turn signals. A hazard flasher switch causes both the left and right lamps used for turn signals to flashing unison. This "four-way flash" is universally understood to be the hazard signal for a stopped or slow-moving vehicle. Because the hazard signal rate and pattern of flash at present is the same as the turn signal rate and pattern, the only way to distinguish a hazard flash from a turn signal flash is to observe that turn signal lights are flashing on both sides of the vehicle.

Many patents in the field concern improvements and modification of the flashers which signal vehicle turns and/or vehicle hazard warnings. Others relate to freestanding devices to warn of road hazards, e. g., disabled vehicles. None of them attempts to introduce a distinctive flash rate and pattern of the hazard flash so as to distinguish it from a turn signal as does the present invention.

2. Related Art

Some patents in the field and their claims:

Belcher et al., U.S. Pat. No. 4,227,174 (Oct. 7, 1980). A non-uniform hazard flash intended to indicate a driver in a distress situation and requesting aid, in contrast to a stopped vehicle with a uniform hazard flash rate and not in need of help. The distress flash pattern described is four short flashes followed by one long flash.

Beacom, U.S. Pat. No. 6,034,599 (Mar. 7, 2000). Coupling apparatus for warning lights on trailing unit.

Lucas, U.S. Pat. No. 3,925,759 (Dec. 9, 1975). Five different flash combinations intended to indicate which of five different situations exists.

Effenberger, U.S. Pat. No. 3,493,927 (Feb. 3, 1967). Emergency flash device which permits left and right directional lights to be flashed either synchronously or alternately.

Michelotti, U.S. Pat. No. 6,023,221 (Feb. 8, 2000). System to activate hazard lights upon hard braking.

Ingram, U.S. Pat. No. 4,346,365 (Aug. 24, 1982). Brake lights caused to flash when brakes have been applied continuously for a predetermined length of time.

Ohkuma, U.S. Pat. No. 5,872,511 (Feb. 16, 1999). Second hazard control switch for passenger use. Also built-in sound indicator.

Davis et al, U.S. Pat. No. 6,069,559 (May 30, 2000). Hazard flasher control system to detect operational and lamp failures.

Fritz, U.S. Pat. No. 5,309,142 (May 3, 1994). Maintain hazard flash rate when lamp outage occurs.

Incorvaia et al., U.S. Pat. No. 5,247,280 (Sep. 21, 1993). Single control for 6-lamp system which satisfies Federal standard regarding lamp-outage indicator as well as standard for hazard flash rate.

Kimmelman, U.S. Pat. No. 5,072,210 (Dec. 10, 1991). Single combination electronic control which indicates turn signal lamp outage and maintains flash rate for hazard signal in spite of lamp outage.

Roller, U.S. Pat. No. 4,893,111 (Jan. 9, 1990).Heavy duty flasher with long life and high reliability.

Spiteri, U.S. Pat. No. 4,173,013 (Oct. 30, 1979) .Combination flasher in which only control circuit current passes through turn signal/hazard switch and pulse rate is generated by a computer chip.

Schorter, U.S. Pat. No. 3,824,542 (Jul. 16, 1974). A representative electronic flasher unit with only two terminals.

Brusca, U.S. Pat. No. 5,512,876 (Apr. 30, 1996). A device to provide timed lighting on vehicles and on portable emergency triangles.

Dagget, et al, U.S. Pat. No. 5,754,124 (May 19, 1998). An electrical hazard marker which is cone shaped, has two brightness levels, and fits into the trunk of a car.

Wu, U.S. Pat. No. 5,349,346 (Sep. 20, 1994). Reflective warning triangle incorporating red LED lights.

Gunter, U.S. Pat. No. 4,952,910 (Aug. 28, 1990). Hazard warning triangle with flashing lights.

Saubolle, U.S. Pat. No. 5,122,781 (Jun. 16, 1992). Battery powered, LED-lit hazard warning device for use in place of a conventional flare.

BACKGROUND OF THE INVENTION

The inventor observed in his experience as an interstate trucker that many times it is not immediately apparent to other drivers whether the flashing lights of a vehicle are intended to signal a turn or to signal a stopped or slow-moving vehicle. This occurs frequently when a truck or car is parked or moving slowly on the shoulder or in a driving lane with four-way lights flashing, but with only one side of the signalling vehicle visible to drivers to the rear, usually because a third vehicle blocks the view from behind. Following drivers who see only one side of the signalling vehicle cannot differentiate between a stopped vehicle with four-way flashers on and a vehicle signalling that it is about to pull into the adjacent traffic lane.

The same thing happens when a bus pulls over to pick up or discharge passengers. Bus drivers often use their four-way flashers while at the curb picking up passengers and then change to a left turn signal as they are about to pull back into traffic. Following drivers who can see only the left signal lights of the bus are unable to tell when the four-ways are turned off and the bus is going to move left.

Even when both flashing rear lights of al stopped or slow-moving vehicle are seen, because turn signals flashing at the same uniform rate are so commonplace, drivers often are not as quickly aware as they could be that they are seeing a hazard warning and not a turn signal. This is especially the case in traffic situations, such as a busy freeway, with many vehicle lights in view. A hazard signal of unique pattern, when it becomes widely recognized, should often alert oncoming drivers more quickly to the hazard posed by a stopped or slow-moving vehicle.

Truckers and other experienced drivers, when driving at highway speeds and coming unexpectedly upon stopped traffic, often turn on their hazard flashers to warn following drivers to expect a very abrupt stop in an unexpected place. A quicker recognition by the following drivers of the hazard alert could make the difference between stopping in time and a having a collision. The distinctive variable rate of the hazard alert flasher could help provide such quicker recognition of the warning signal.

Incorporation of the hazard alert flasher, with its distinctive flash sequence, into free-standing emergency electric lanterns and illuminated warning triangles could have the potential for better and earlier recognition of the signal for a disabled vehicle and could result in increased safety.

SUMMARY OF THE INVENTION

It is the objective of the invention to:
1) Create a hazard alert flash sequence with distinctive flash rates and patterns so that hazard signals can be quickly and easily distinguished from turn signals.
2) Create a unique hazard alert flash sequence, as in 1), to be submitted for approval to highway authorities for adoption as newly accepted hazard flash rates and patterns which are different from rates and patterns presently permitted by highway regulations.
3) Create a unique hazard alert flash sequence, as in 1) and 2), intended to be a universal warning signal of a highway hazard.
4) Provide highway vehicles with a pulse-generating device to control the hazard warning flasher and produce a differential non-uniform flash pattern which is distinctive and readily distinguished from turn signals.
5) Provide pulse-generating devices to convert existing vehicles to the non-uniform hazard flash pattern.
6) Provide pulse generating devices with the non-uniform hazard flash pattern to install in new vehicles.
7) Provide pulse generating devices, for turn signals and hazard warning flashers, with flash patterns and rates controlled by microprocessors, which devices can produce the non-uniform hazard alert sequence.
8) Provide pulse generating devices for emergency electric lanterns, illuminated emergency warning triangles, and electric replacements for pyrotechnic flares, which can produce the same or similar non-uniform hazard alert pattern as automotive hazard flashers, for improved recognition.
9) Provide flasher pulse generating devices, as above, adaptable to incandescent bulbs, light emitting diodes and other light sources including varied-color sources.
10) Provide flasher pulse generating devices which can be built with programming to meet whatever different flash rates and patterns as may be needed.

DESCRIPTION OF THE INVENTION

The hazard alert flasher described generates hazard warning flasher rates and patterns for highway vehicles and for highway emergency electric lanterns. A specific and unique flash pattern is intended to alert other motorists, at first sight, that they are seeing a hazard warning and not a turn signal. After numerous trials a signal consisting of three very short flashes followed by a pause has been selected for the automotive hazard alert flasher prototype.

The flash rate of the automotive prototype is designed to comply with the requirements of federal and stale laws and regulations. The standard adopted by the authorities is that of the Society of Automotive Engineers (SAE). SAE J945 provides that the hazard flash rate shall be 60 to 120 flashes per minute and the percent on time shall be 30% to 75%. The flash rate of the automotive prototype as programmed is 120 flashes per minute and 32% on time.

The flash rate and pattern used in the automotive prototype has been judged by the inventor to work adequately with incandescent bulbs or light emitting diodes (LED's). If the regulations could be modified to allow for more flashes per minute and a lower percent of on time, it is anticipated that a different rate of flash would be preferred.

An application using exclusively LED's or other devices could make it practical and desirable to have different rates and/or patterns. The relatively long warm up and cool down time of incandescent bulbs limits how short the on time and the off time can be compared to LED's.

Because the emergency electric lantern is planned for use only with LED's and because it is assumed that the above mentioned SAE standards do not apply, the prototype emergency electric lantern flash rate is faster than the rate used for the vehicle prototype.

The hazard flash rate and pattern of the automotive prototype is, in milliseconds:

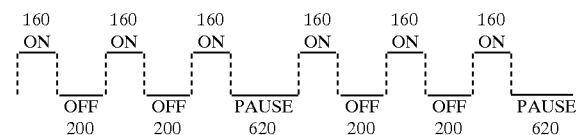

The hazard flash rate and pattern of the emergency electric lantern prototype is, in milliseconds:

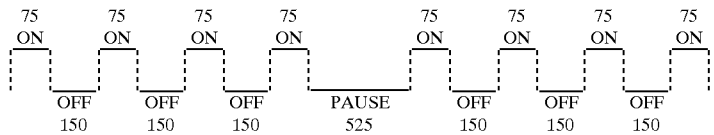

To achieve the differential, non-uniform flash rate of the hazard alert flashers, a microprocessor is used. If a different rate or pattern of hazard flash is needed or desired, the microprocessors can be so programmed.

In the vehicle application, one of the microprocessor leads is connected to the left turn signal and another to the right turn signal. The microprocessor provides the hazard flash rate and pattern when both left and right turn signal leads are grounded through the lamps. The standard turn signal rate and pattern of flash is produced if only one turn signal lead is so grounded.

The electric flow through the microprocessor is only enough to actuate the control coil of the relay. When the relay closes, electric current adequate for all the signal lamps on the vehicle can flow through the relay to the turn signal/hazard signal control switches and from there to the lamp circuits.

DETAILED DESCRIPTION OF DRAWINGS

Figure 1:
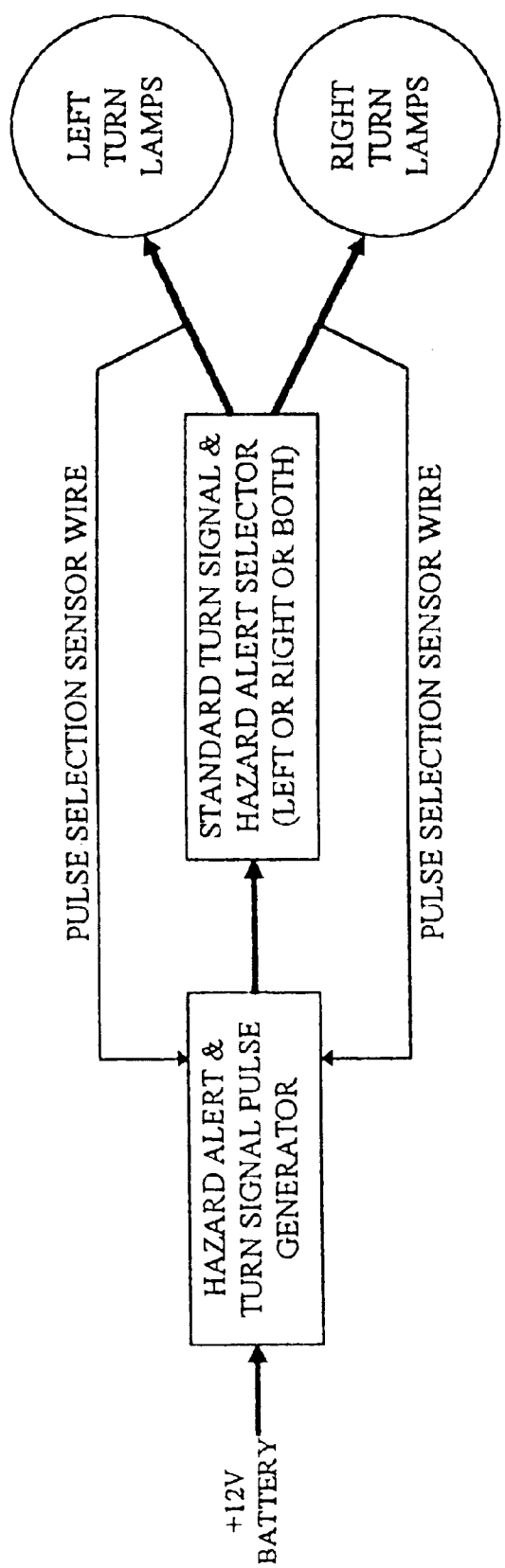
FIG. 1 is a block diagram showing how the pulse generator fits into the wiring of a vehicle.

FIG. 1: When the turn signal-hazard alert selector is engaged a circuit is completed through the left turn lamps, through the right turn lamps, or through both left and right turn lamps. Through the pulse selection sensor wires, the pulse generator senses whether both left and right side lights are energized or just one side. If only one side is energized, the pulse produced is the standard turn signal pulse. If both sides are energized, the distinctive hazard alert pulse is produced.

Figure 2:
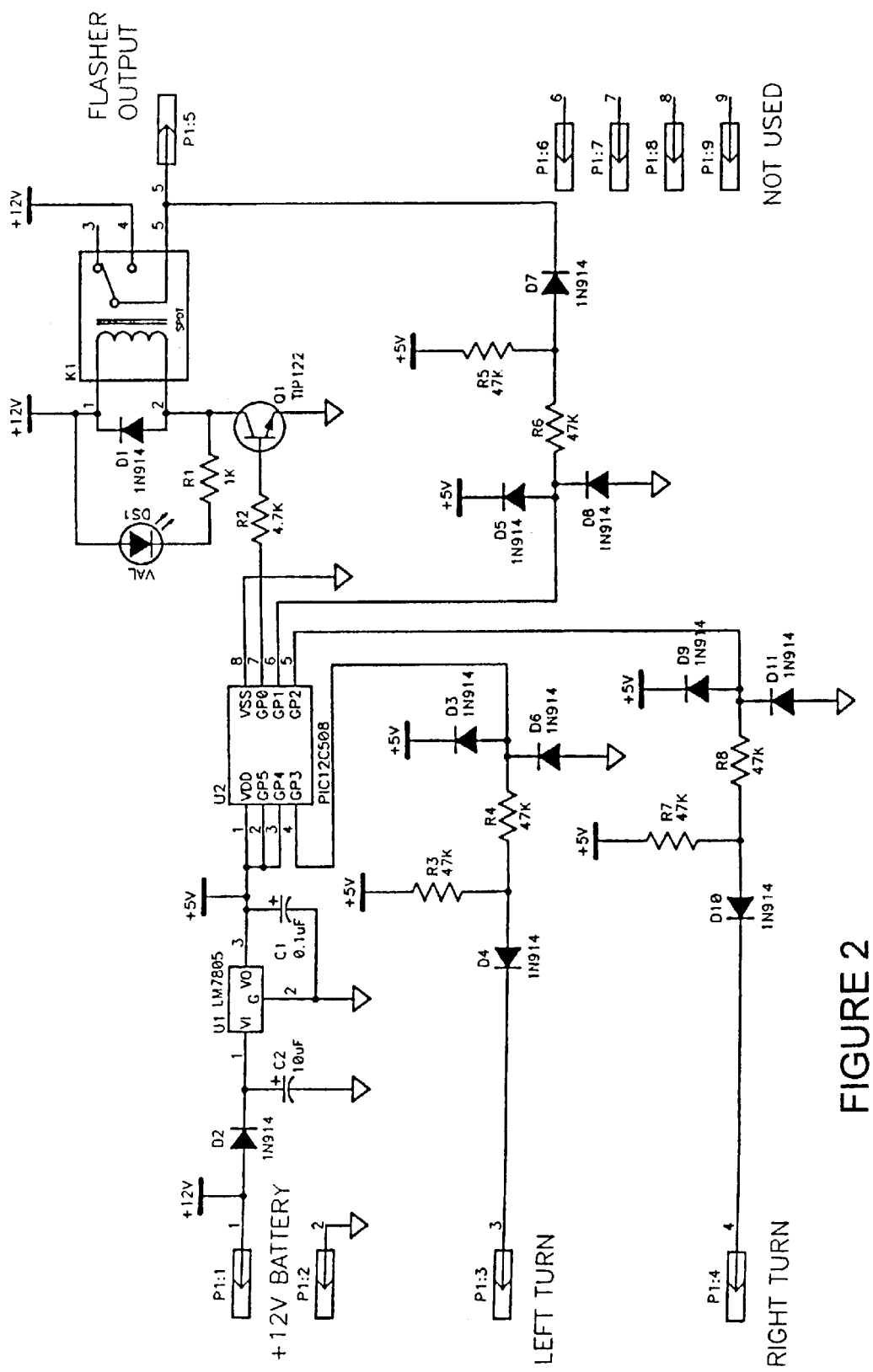
FIG. 2 is a wiring diagram of the prototype hazard alert pulse generator for installation into a motor vehicle. It can drive a large number of lamps, e.g., as in truck applicatons, and also can produce standard turn signal pulses.

FIG. 2: The Automotive Flasher Unit is designed around a single chip 8-bit microprocessor. The processor used in the prototype is a MicroChip PIC12c508 microprocessor, however, there are dozens of other 8-bit processors that could be used for this purpose. Pin connections to the microprocessor (uP) are as follows:

| Signal Name | uP Pin | I/O | Function |
| --- | --- | --- | --- |
| LTurn | 4 | Input | Left Turn has been activated |
| RTurn | 5 | Input | Right Turn has been activated |
| FO | 6 | Input | Monitor flasher relay output |
| None | 2 | | Unused |
| RLYdrive | 7 | Output | Flasher relay drive output |
| Vdd | 1 | | +5 Volts to uP |
| Vss | 8 | | Ground to uP |
| none | 3 | | Unused |

The uP performs logic to create the functions output from the Flasher Unit. The functions are:
1) Create hazard warning flash
2) Create turn signal Create Hazard Warning Flash Logic If the OF (Flash Output) signal line is low while the RLYdrive (Relay Drive output) is low, one of the three signals has been activated ,i.e. Right turn, Left turn or Hazard warning. If both the Right turn and Left turn inputs are high, the Hazard warning signal has been activated.

Create Turn Signal Logic

If the OF (Flash Output) signal line is low while the RLYdrive (Relay Drive output) is low, one of the three signals has been activated, i.e. Right turn, Left turn or Hazard warning. If either the Right turn or Left turn input is high, but not both, the turn signal has been activated.

For the purposes of the prototype designs, the Hazard Flash outputs are a series of flashes as follows:

(1) Automotive application: On 160 ms, off 200 ms, on 160 ms, off 200 ms, on 160 ms, off 620 ms, Repeat every 1.5 seconds.

(2) Freestanding signals: On 75 ms, off 150 ms, on 75 ms, off 150 ms, on 75 ms, off 150 ms, on 75 ms, off 525 ms, Repeat every 1.275 seconds.

Theses sequences can be replaced with any other combination of repeating or non-repeating flashes and pauses.

For the purposes of the automotive prototype design, the Turn Signal output is a series of flashes as follows:

On 333 ms, off 333 ms, Repeat to produce approximately 90 flashes per minute.

The turn signal sequence could be tailored to suit any application.

The Left turn and Right turn inputs are monitored periodically throughout the flash sequence. If the status of the Left turn or Right turn signals changes, i.e. the Hazard Flasher or the Turn signal is turned off, the RLYdrive output is turned off (the flasher is turned off) and the program is directed back to the location where the Left turn and Right turn input signal lines are tested for Hazard Flasher or Turn signal activity.

The RLYdrive (relay drive output) signal is fed to the base of transistor Q2 through a current limiting resistor R3. When current is driven into the base of Q2 through R3, the collector of Q2 is pulled to ground potential and relay K1 is energized. This completes a circuit through the normally open contacts of K1 to impress 12 volts ont OF (Flasher Output). Through the external vehicle switching (turn signal or hazard flasher contacts) power is delivered to the turn signal/flasher lamps. D1 is present to protect Q2 and the rest of the 5 Volt circuitry from voltage spikes created when K1 is de-energized. DS1 is an LED (Light Emitting Diode) that can be installed to indicate that the flasher is operating in the flash mode. R2 limits current through DS1.

Typical input circuitry is described. The Left turn input is connected to the cathode of a diode (D4). This diode blocks the current into the Left turn input after the voltage rises above 5 Volts, thus limiting the operating input voltage to the uP to 5 Volts. This is well within the limits for the uP. R4 pulls the input of the uP to +5 Volts when there is no connection to the Left turn input ,i.e. when the turn signal is off. R5 is a current limiting resistor for voltage spikes entering through the Left turn input. D3 and D9 limit the noise voltage to ground or +5 Volts depending on the polarity of the noise current.

The power supply circuit is described. The power is connected to the circuit between ground (−) and the anode of D2 (+). D2 is present to provide polarity protection for the entire circuit. If the power connections are reversed, no current can flow to the circuit, since D2 is reverse biased. C2 provides filtering for the input current. U1 is a three terminal regulator that regulates the input voltage (+9 to +16 Volts) to +5 Volts. The +5 Volts is supplied to all points in the circuit requiring +5 Volts. C1 is an output filter for the +5 Volts.

Figure 3:
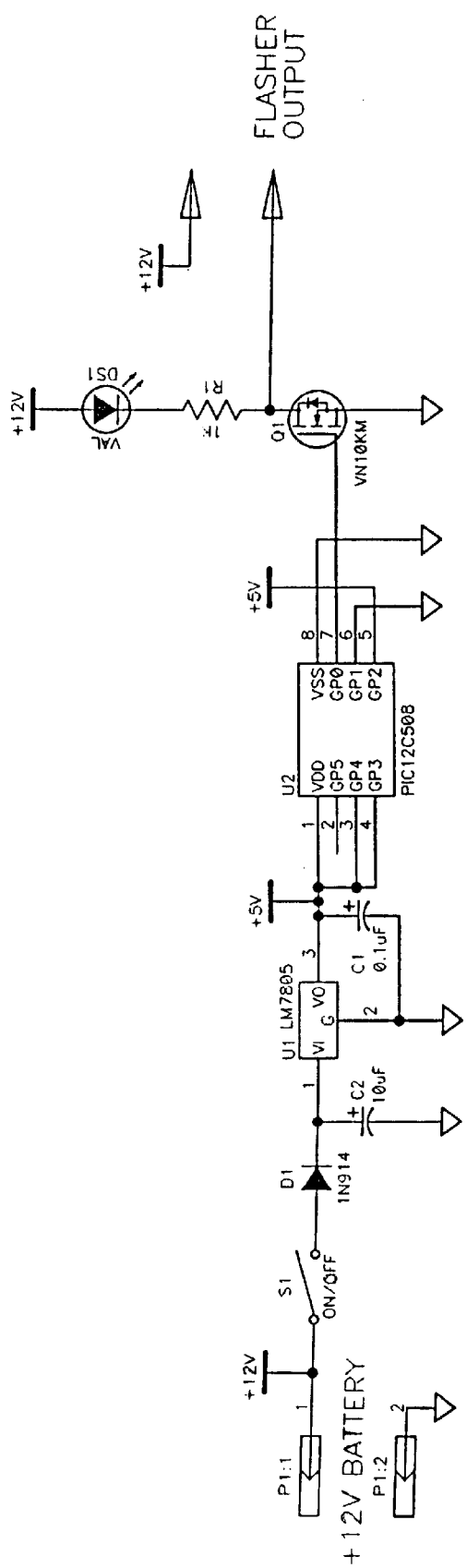
FIG. 3 is a wiring diagram of the prototype hazard alert pulse generator as designed to drive only a small number of lamps as in a freestanding emergency warning device.

FIG. 3: The freestanding Flasher Unit is designed around a single chip 8-bit microprocessor. The processor used in the prototype is a MicroChip PIC 12c508 microprocessor, however there are dozens of other 8-bit processors that could be used for this purpose. Pin connections to the microprocessor (uP) are as follows:

| Signal Name | uP Pin | I/O | Function |
| --- | --- | --- | --- |
| unused | 3 | | |
| unused | 5 | | |
| unused | 6 | | |
| unused | 2 | | |

| Signal Name | uP Pin | I/O | Function |
|---|---|---|---|
| LMPdrive | 7 | Output | Flasher drive output |
| Vcc | 8 | | +5 Volts to uP |
| Vss | 1 | | Ground to uP |
| Unused | 4 | | |

The uP performs logic operations based on time to create the flashing output from the Flasher Unit.

For the purpose of a prototype design, the Emergency Flash output is a series of flashes as follows: On 75 ms, off 150 ms, on 75 ms, off 150 ms, on 75 ms, off 150 ms, on 75 ms, off 525 ms, Repeat every 1.275 seconds. This sequence may any other combination of repeating or non-repeating flashes.

The unit is activated by placing the ON/OFF switch (S1) in the ON position. Power is thus applied to the microprocessor, which activates, goes through its reset routine and then proceeds with a standard program of activating and deactivating the lamp drive output (LMPdrive). The LMPdrive (lamp drive output) signal is fed to the base of transistor Q1. When voltage is applied to the gate of Q1, the drain of Q1 is pulled to ground potential and the flasher lamp is energized. The unit continues to drive the flasher lamp until the unit is deactivated by turning the ON/OFF switch to the OFF position.

The power supply circuit is described. Battery power is connected to the circuit between ground (−) and one end of S1. The other end of S1 is connected to the anode of D1. D1 is present to provide polarity protection for the entire circuit. If the power connections are reversed, no current can flow to the circuit since D1 is reverse biased. C2 provides filtering for the input current. U1 is a three terminal regulator that regulates the input voltage (+9 to +16 Volts) to +5 Volts. The +5 Volts is supplied to all points in the circuit requiring +5 Volts. C1 is an output filter for the +5 Volts.

Figure 4:
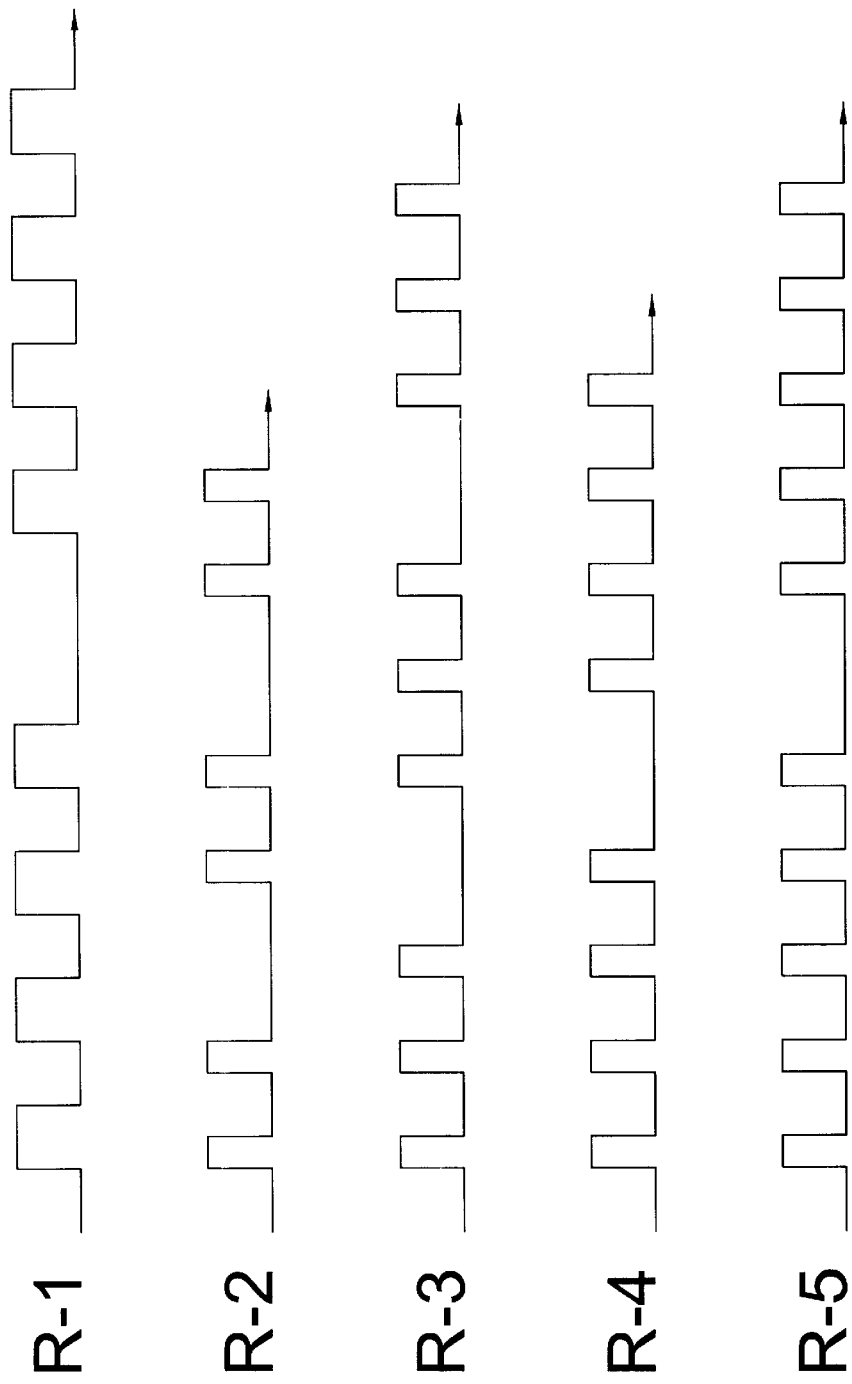
FIG. 4 shows diagramatically the on and off flash patterns of the hazard signals claimed.

FIG 4: Repeating hazard alert flash patterns:

R-1: Four short flashes followed by a longer pause. Flashes of 160 milliseconds separated by off times of 200 milliseconds and followed by a pause of 620 milliseconds. This pattern was intended to comply with the old SAE time requirements.

R-2: Two short flashes of 75 milliseconds separated by an off time of 150 milliseconds, followed by a pause of 450 milliseconds.

R-3: Three short flashes of 75 milliseconds separated by an off time of 150 milliseconds, followed by a pause of 450 milliseconds.

R-4: Four short flashes of 75 milliseconds separated by an off time of 150 milliseconds, followed by a pause of 525 milliseconds.

R-5: Five short flashes of 75 milliseconds separated by an off time of 150 milliseconds, followed by a pause of 525 milliseconds.

Figure 5:
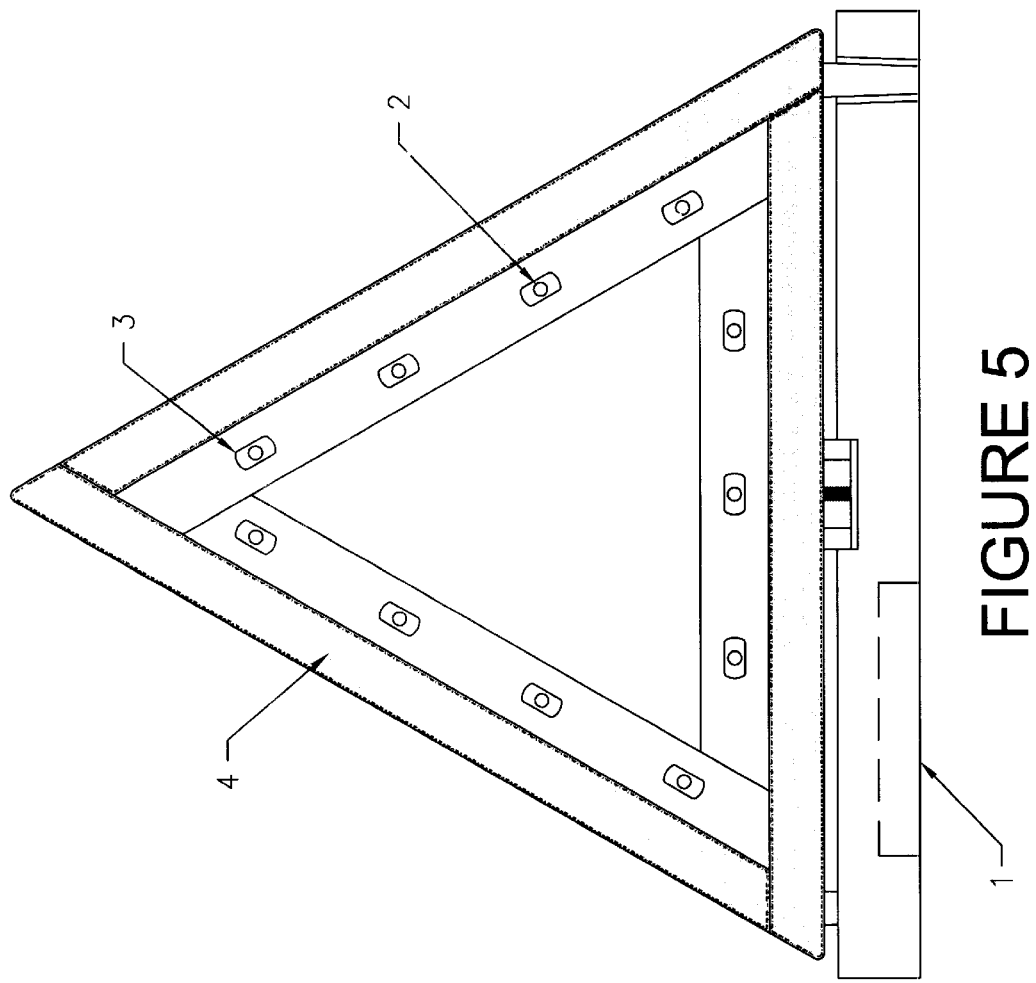
FIG 5 shows the front view of an emergency warning triangle with LED lights providing the hazard flash alert signal.

FIG. 5: A standard emergency warning triangle as required on large trucks, with hazard alert flasher added (front view).

1. Battery pack with four AA bai[]teries in series plus hazard alert flash pulse generator.
2. LED light (11 in all).
3. Plastic bulb holder for LED light, glued to front of plastic triangle frame.
4. Reflector strip, part of standard truck emergency triangle.

Figure 6:
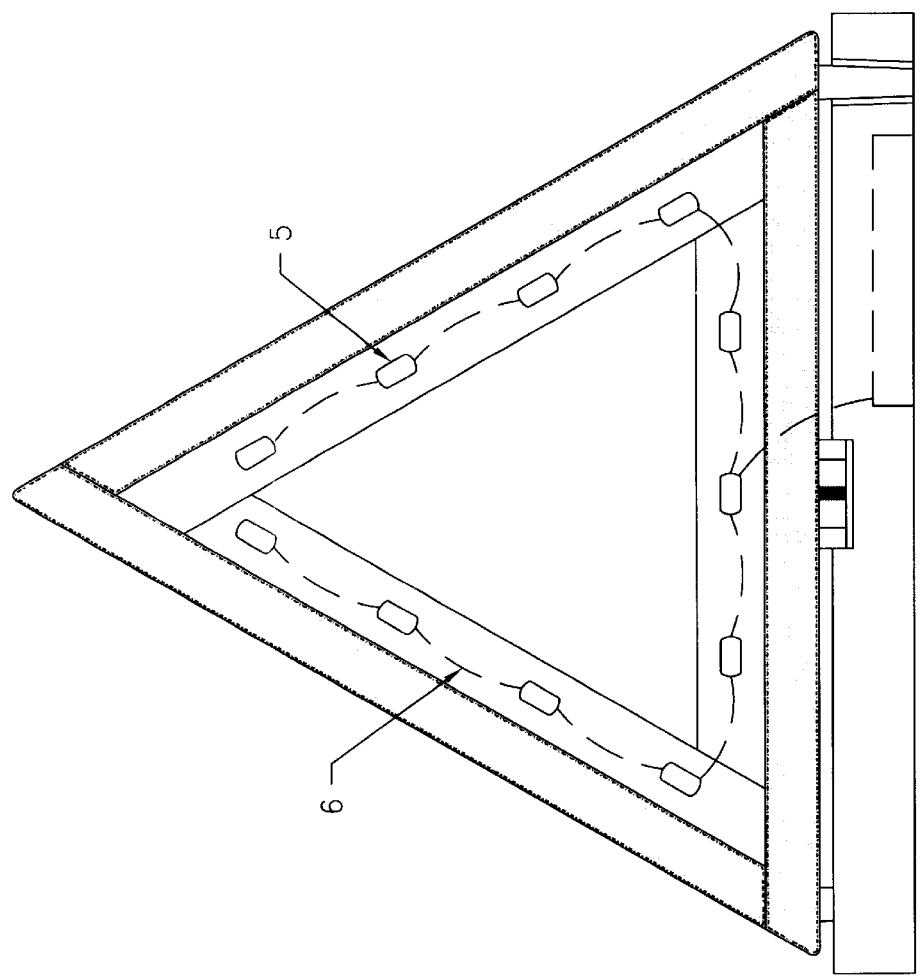
FIG. 6 shows the rear view of an emergency warning triangle with LED lights providing the hazard flash alert signal.

FIG. 6: Emergency warning triangle with hazard alert flasher (rear view).

5. Rear plastic LED holder, glued to frame.
6. Wiring from pulse controller to LED lights.

I claim:

1. For motor vehicles, including trucks of all sizes, buses, automobiles, and motor cycles, a turn signal / hazard signal flasher control device which automatically provides an improved hazard alert flash sequence which can be distinguished from a vehicle turn signal even if only one lamp is seen, said flash sequence consisting of a number of brief flashes separated by short off times, all followed by a longer pause or off time; which flash sequence is significantly more striking to the eyes of other drivers compared to the standard four-way flash hazard sequence presently used and should often result in quicker recognition that a hazard is being signaled.

2. A flasher control device to provide a hazard alert flash pattern, as in claim 1, for portable emergency flashers, for illuminated emergency warning triangles, and for electric lighted substitutes for pyrotechnic flares, which should be recognizable as the same hazard flash used on vehicles and would be more striking than a slow uniform flash.

3. A flasher control device, as in claim 1 or 2, to provide a hazard flash pattern consisting of three short flashes, separated by two off times, all followed by a longer pause or off time, after which the cycle begins again.

4. A flasher control device, as in claim 1 or 2, to provide a hazard flash pattern consisting of four short flashes, separated by three short off times, all followed by a longer pause or off time, after which the cycle begins again.

5. A flasher control device, as in claim 1 or 2, to provide a hazard flash pattern consisting of five short flashes, separated by four short off times, all followed by a longer pause or off time, after which the cycle begins again.

6. A flasher control device as in claim 1, which senses whether a turn signal or a hazard flash is indicated and automatically provides the appropriate flash sequence, with no new switches or controls and no additional operator input from what is presently required on such vehicles.

7. An electronic flasher system which uses a microprocessor to produce a turn signal pulse, and also to produce distinctive hazard flash pulse patterns, and to automatically provide the appropriate flash sequence as in claim 1.

8. A flasher control device as in claim 1 or 2, to provide a hazard flash pattern consisting of two short flashes, separated by an off time, all followed by a longer pause or off time, after which the cycle starts again.

* * * * *